United States Patent

[11] 3,542,242

| [72] | Inventors | Gerald O. Irvine<br>Coldwater;<br>Ronald J. Fischer, Wapakoneta, Ohio |
|---|---|---|
| [21] | Appl. No. | 803,924 |
| [22] | Filed | March 3, 1969 |
| [45] | Patented | Nov. 24, 1970 |
| [73] | Assignee | Avco Corporation<br>Coldwater, Ohio<br>a corporation of Delaware |

[54] PRECISION SEED-METERING DEVICE
9 Claims, 7 Drawing Figs.

[52] U.S. Cl. ................................................. 221/211
[51] Int. Cl. ................................................. B23q 7/04
[50] Field of Search ..................................... 221/210, 211, 266, 278

[56] References Cited
UNITED STATES PATENTS
2,960,258  11/1960  Dodwell ..................... 221/211X FOREIGN PATENTS
802,899  10/1958  Great Britain ............... 221/211

Primary Examiner—Samuel F. Coleman
Attorney—Charles M. Hogan and Gary M. Gron

ABSTRACT: The invention is a rotatable seed-distributing drum for use in a pneumatic seed-distributing system. The drum is constructed of preformed interfitting modules which may be stacked in any convenient number of multiples to form a segment or a ring, a plurality of which may be put together to form the drum. Preforming permits the accurate shaping of the seed-receiving orifices and of the collateral air-conducting conduits and also permits them to be located accurately with respect to each other so that the seed-receiving openings will register with a battery of seed-ejecting plungers.

Patented Nov. 24, 1970
3,542,242
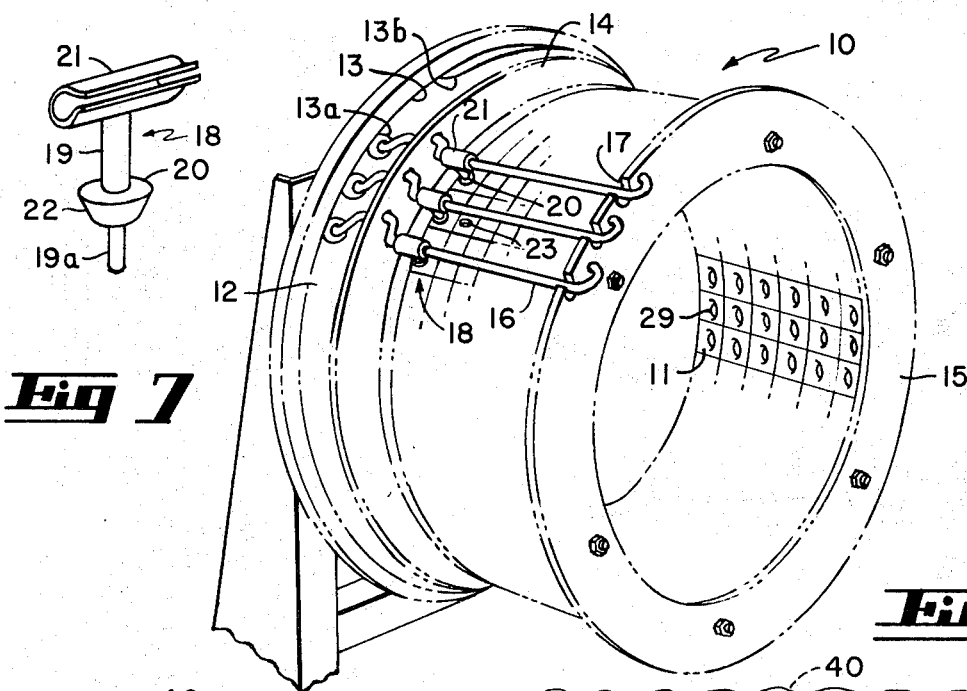
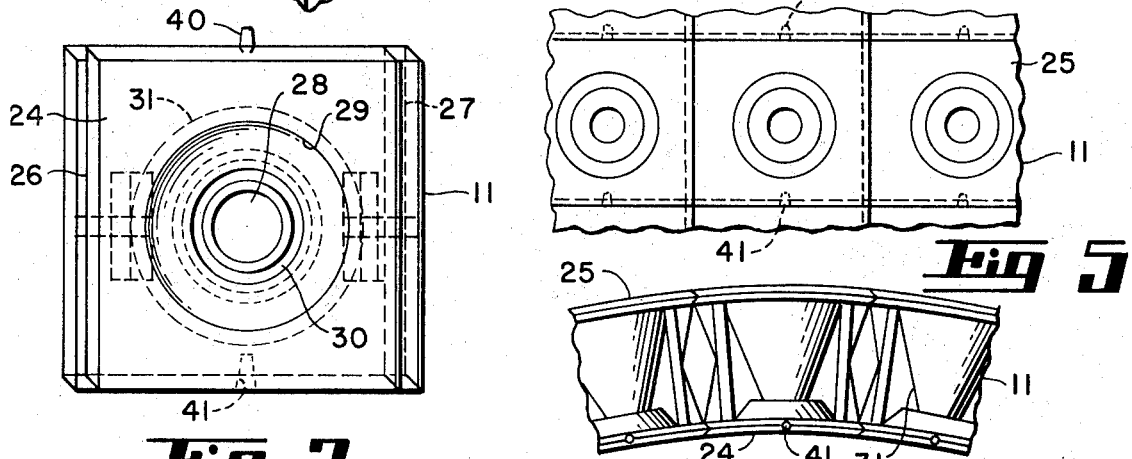
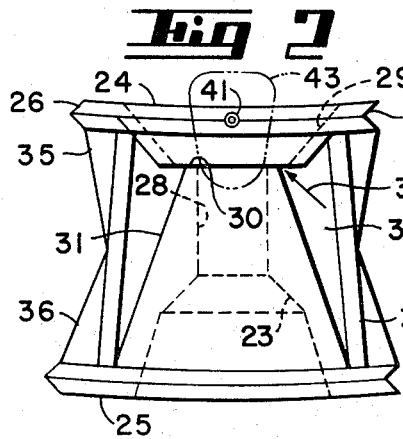
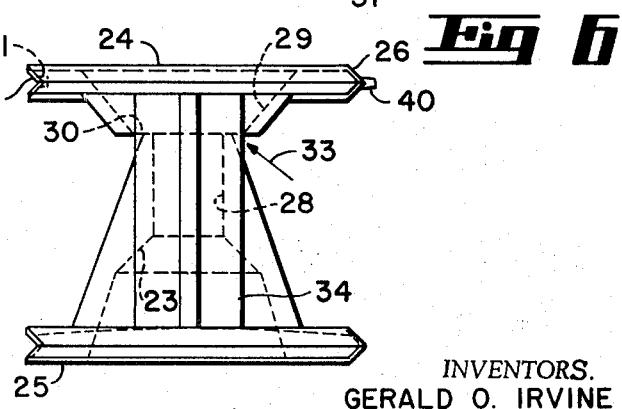
INVENTORS.
GERALD O. IRVINE
RONALD J. FISCHER
BY
Charles M. Hogan
Gary M. Gron
ATTORNEYS.

PRECISION SEED-METERING DEVICE

The invention is an improvement on the pneumatic seed-metering and distributing device described and claimed in Loesch et al. U.S. Pat. application Ser. No. 684,357, filed Nov. 20, 1967, entitled "Seed Planter". In that application the inventors disclosed a seed-dispensing apparatus in which seed, such as corn, was deposited in a drum having openings therein and including air pressure generated within the drum for directing seed into said openings and holding a single seed in each of the openings. The drum was so constructed that an air flow was created around each opening and around the single seed held in each of the openings to carry away the excess seeds. At a given point adjacent the periphery of the drum, plungers, alined with the seed-receiving openings, were actuated to dislodge the seed held within each opening and drop it into a discharge tube.

Loesch discloses a metal drum with the equivalent of a double wall to provide seed-receiving orifices of special configuration with adjacent air-conducting passages. In practice it has been found difficult to economically manufacture such a drum and to insure that the orifices (which we shall call openings) for holding the seed are sufficiently accurately aligned. Precise alinement is necessary since according to the Loesch system any one of a large number of rows of seed-receiving openings, spaced peripherally around the drum, must arrive at a given point adjacent said periphery at the same time, with each opening in exact position to receive a plunger alined with each opening and operable to eject each seed held at that time in said opening.

In accordance with the invention we provide preformed elements adapted to interfit with each other into modules of predetermined interior and exterior configuration for easy assembly into a unitary drum. The elements can thus be very accurately formed so that when assembled and united into a drum form they are perfectly interfitted and have their openings in perfect alinement with the plungers which are arranged to move radially inwardly to eject selected seed simultaneously from an entire row at the time when such row arrives at a predetermined point in its arc of travel.

Further in accordance with the invention, each of the several preformed elements are accurately shaped interiorly so that the air-conducting passages surrounding each seed-receiving opening are accurately formed for efficiently performing their assigned function of permitting excess seed to be carried away from such opening.

It will be apparent therefore that a primary object of the invention is to provide an improved seed-metering drum of the Loesch type in which the necessary double wall (or equivalent), with accurately formed and precisely spaced seed-receiving openings and adjacent air-conducting passages, can be easily and economically manufactured.

A further object is to provide modular elements with interfitting means to key a plurality of such elements together in any preselected modular form while insuring that all the modules are in precise alinement.

Another object is to provide a drum of light weight for use in field-going equipment but of sufficient strength to withstand the rigorous conditions to which such equipment is customarily subjected.

Other objects and advantages of the invention will more fully appear when reference is had to the following description made in connection with the accompanying drawings in which:

FIG. 1 is a perspective view of a Loesch-type drum formed of a series of modules with illustrative seed-ejecting plungers and plunger-operating mechanisms cooperating with the seed-receiving openings of one ring of modules. It will be appreciated that duplicate parts on FIG. 1 have been omitted for the purpose of clarity;

FIG. 2, 3 and 4 are enlarged plan, front elevation, and side elevation views, respectively, of a single element constructed in accordance with the principles of the invention, the plan view being taken from a position within the interior of the drum and looking downwardly;

FIGS. 5 and 6 are plan and front elevation views, respectively, with parts broken away, of a series of elements united to form a segment of a ring, a series of which may be united to form a drum, the plan view of FIG. 5 being taken from a position exterior of the drum and looking downwardly;

FIG. 7 is a perspective view of one of the plungers which is actuated at a predetermined time during the rotation of the drum to eject seed held in the opening of an element.

While the individual elements of the invention may be preformed of any appropriate type of material, we have found it advantageous to preform these elements by molding a thermosetting acrylic resin such as 40 percent fiber filled ABS resin (meaning 40 percent shredded fiberglass in a matrix of acrylonitrile-butadiene-styrene). Such an exemplary embodiment of the invention will now be described.

Referring to FIG. 1, it will be observed that drum 10, comprising a number of interfitting modules 11, is mounted for rotation on a horizontal axis within a circular plate 12 having an internal cam surface 13. Supporting flanges 14, 15 are provided, having longitudinally alined holes for receiving bellcranks 16, flange 15 having cutaway portions 17 at regular intervals to accommodate the movement of the bellcranks which rotate in the aligned holes when actuated by a cam track 13b on cam surface 13. Attached to said cranks are a series of plunger members 18 formed as shown in FIG. 7.

Each member 18 is formed with a stem 19 carrying a valve 20 intermediate its ends and a collar 21 at its upper end adapted to be secured to a crank 16, members 18 being made of a tough plastic material having sufficient resiliency to permit collars 21 to snap on the crank pins. The valve 20 is provided with a formed or ground conical surface 22 which fits accurately into valve seat 23 of an individual element 11, as will hereinafter more clearly appear from an inspection of FIGS. 3 and 4.

As previously indicated, the elements 11 are preformed as by molding, conveniently by injection molding, to produce the configuration shown in detail in FIGS. 2—6, inclusive. Thus the bottom 24 and top 25 of each element (shown reversed in FIG. 3) are curved in an arc equal to a radius of the drum, with laterally formed tongues 26 and grooves 27 designed to interfit with adjacent elements. These tongues and grooves are continued around the adjacent side of each element, as shown in FIG. 4. A locating pin 40, adapted to fit into a hole 41, is provided on opposite sides of each element so a series may be keyed together in precise alinement. A central passage 28 is provided for the reception of the end 19a of valve stem 19.

A pocket 29 is provided in the interiorly facing side of each element 11. Each pocket surrounds the inner end of passage 28 and is of a diameter sufficiently large to hold a single seed but leave an annular opening 30 between the inner end of the pocket and the adjacent edge of conical wall 31 defining the outer surface of the chamber forming valve seat 23 and passage 28. This permits a secondary stream of air developed in space 32 (FIGS. 3 and 4) to pass through the annular openings 30 in the direction of arrows 33 to sweep away seeds in excess of the single seed held in pocket 29 by the primary stream of air caused by air pressure developed in the interior of the drum.

In further clarification of the nature and functioning of the seed-metering and distributing system in which the invention is particularly useful, it is pointed out that the drum 10 is closed at its ends and means provided to feed seeds into the lower part thereof and to impart rotation thereto. Air pressure generated within the drum creates a stream of air outwardly through passages 28 and causes seeds 43 to seat themselves individually in passages 28 at the bottom of pockets 29, as shown in FIG. 3. Excess or undesired seeds are swept away into the lower part of the drum by a secondary flow of air moving through annular space 30 in the direction of arrows 33. The desired seeds are carried upwardly by rotation of the drum to near the high point of their travel, at which time the cam track 13b on cam surface 13 actuates cam rollers 13a to rotate cranks 16 downwardly to push plungers 18 downwardly and eject each seed in a longitudinal row of pockets 29 toward the inside of the drum. The seeds are pushed positively toward the open end of discharge tubes (not shown) located beneath each pocket where they are carried to the seeder boot by an air stream, as described more particularly in Loesch et al., supra.

Elements 11 are molded with supporting members 34 and reinforcing members 35, 36 so that each unit is strengthened and becomes a structural part of a complete drum when built up as shown in FIG. 1. It will be noted that bottom member 24 (FIG. 3) is slightly smaller in lateral extent than top member 25 since it forms a cylindrical surface of lesser diameter.

Individual elements 11 may be conveniently built up into a segment or a ring by fitting them together in an appropriate arc and cementing them with a suitable cement, for example, an epoxy adhesive. The peg 40 and hole 41 may be molded in each element so that the openings 28 and pockets 29 in elements 11 are in the proper predetermined position when the segments are fitted together.

It will now be apparent that molded elements 11 of the configuration shown may be united in any desired manner to produce convenient modules to construct a drum where there are rigorous requirements concerning the size and configuration of the openings therein which connect with the interior and exterior thereof. While this invention is particularly suitable for and useful in the manufacture of drums of the type described in the above referred to Loesch application, it is not limited thereto but is applicable to multiple unit devices where similar requirements must be met.

We claim:
1. A drum having a double wall;
a plurality of alined openings extending through said walls through which openings a primary air stream is directed outwardly from the interior of said drum;
a plurality of openings intermediate said walls through which a secondary air stream is directed laterally of the first stream; and
said drum comprising a plurality of preformed units of identical configuration, interfitted and secured together to form a unitary cylinder.

2. A drum according to claim 1 in which the said plurality of preformed units are secured together to form rings and a plurality of said rings are interfitted and secured together to form a unitary cylinder.

3. A drum according to claim 1 in which said second-mentioned openings are disposed in inwardly extending pockets.

4. A drum according to claim 3 in which said second-mentioned openings are annularly disposed around the interiorly disposed ends of the first-mentioned openings.

5. A drum according to claim 1 in which said openings for said secondary air stream are annular in configuration and surround the interiorly disposed ends of the openings for said primary air stream.

6. A drum according to claim 1 in which each unit is provided with supporting and reinforcing members extending between the inner and outer walls of said drum.

7. A drum according to claim 1 in which each unit includes means to key it to adjacent units for accurate assembly into cylindrical form.

8. A drum according to claim 1 in which each unit is formed of a thermosetting acrylic resin.

9. A seed dispensing apparatus comprising in combination:
a rotatable drum constructed of plurality of preformed units of identical size and configuration, interfitted with and secured to each other to define a cylinder;
regularly spaced rows of units extending axially thereof;
each unit having preformed seed-retaining openings extending radially of said cylinder;
a plurality of plungers disposed in said openings;
each plunger having a preformed valve at one end thereof adapted to coact with a preformed valve seat in each seed-retaining opening;
said plungers being disposed in alignment with one row of openings;
plunger actuating means; and
quick attachment means on the other end of said plungers for cooperation with said plunger actuating means.